Patented May 27, 1924.

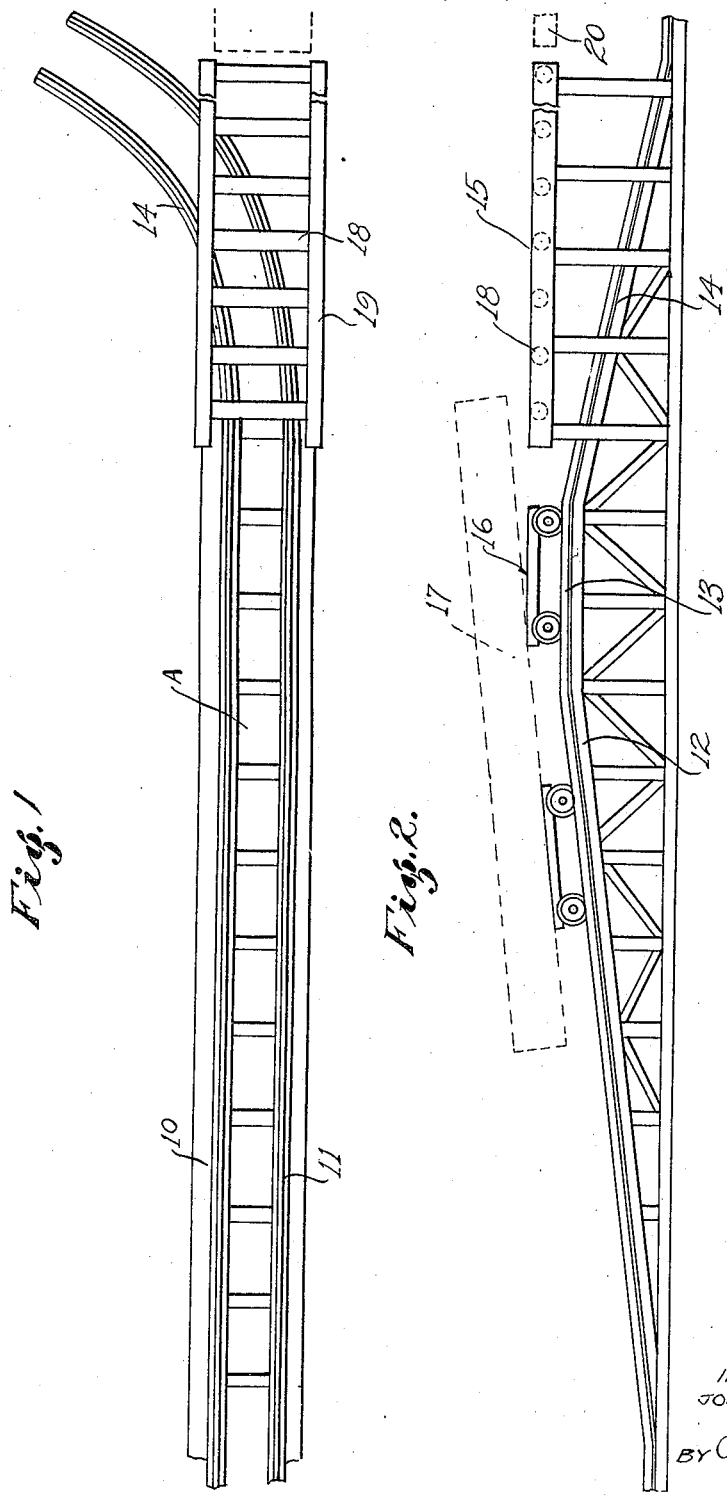

1,495,339

UNITED STATES PATENT OFFICE.

JOHN MAHER, OF VALLEJO, CALIFORNIA.

LUMBER-LOADING MEANS.

Application filed August 10, 1921. Serial No. 491,173.

*To all whom it may concern:*

Be it known that I, JOHN MAHER, a citizen of the United States, residing at Vallejo, in the county of Solano and State of California, have invented new and useful Improvements in Lumber-Loading Means, of which the following is a specification.

This invention relates to means for loading lumber.

At the present time it is common practice to equip a lumber yard with rail tracks over which small trucks may be moved and which trucks are provided to receive stacks of lumber. The usual method of using these trucks is to pass them along the tracks and assemble a stack of lumber to fill an order, after which the lumber is transferred to a set of supports and these supports hold the lumber until it is again transferred onto a delivery truck.

It is a principal object of the present invention to provide means whereby the lumber may be directly transferred from the trucks onto a loading platform of indefinite length which will carry the lumber out of an obstructing position in the alleys between the lumber piles, and will permit it to be readily transferred onto a delivery truck, as desired.

The present invention contemplates the use of a track having an inclined portion upon which the lumber trucks may be moved and which track is then led down beneath a loading platform, at the same time transferring the lumber from the trucks onto the platform and permitting the trucks to move away from the loading platform to thereafter be refilled.

The invention is illustrated by way of example in the accompanying drawing in which Fig. 1 is a fragmentary view in plan showing a section of the track with which the present invention is concerned;

Fig. 2 is a fragmentary view in side elevation showing the construction of the present invention.

Referring more particularly to the drawing, 10 and 11 indicate the rails of an industrial track adapted to be laid in a lumber yard. This track, as it will be understood, may be of any desired length and configuration. At some point in the track, it is desirable to form the section A. This section includes an inclined track way 12 leading onto an elevated portion 13 and directly connected with a downwardly inclined track portion 14. The downwardly inclined section of track 14 extends beneath a loading platform 15 and may be turned to one side, as shown in Fig. 1 to permit the loading truck 16 to pass beneath the platform and be thereafter moved along the track. The trucks 16 may be of any desired construction, although it is preferred to form them along the lines of the usual industrial trucks, in which case they will be fitted with flanged wheels and a small bed adapted to serve as a support for a stack of lumber 17. The loading platform 15 is of greater width than the track and is formed with a plurality of transverse rollers 18 supported in bearings carried along side rails 19. The tops of the rollers are disposed above the rails along the portion 14 of the track a sufficient distance to cause them to be in line with the top surface of a truck 16, as it passes along the track section 13, thus making it possible for the stack of lumber 17 to be partially supported on the trucks 16 and the rollers 18 as the transfer of the lumber is made from the trucks onto the loading platform.

In the operation of the present invention the trucks 16 are used to receive a stack of lumber 17 which may then be moved around on the track and thereafter forced up along the incline 12 of the track. The inclination of this incline is such as to cause the forward end of the stack of lumber to overhang the end of the loading platform as ascent is made, and to thereafter permit the lumber to be gradually shifted onto the loading platform as the trucks successively pass along the elevated section 13 of the track. After this, the trucks will pass down the incline 14 and at this time will cause the weight of the lumber to be transferred onto the loading platform. When the last truck has passed beneath the loading platform, the weight of the lumber will be entirely supported on the rollers of this platform and it will be a very easy matter thereafter to move the lumber lengthwise of the platform. If the loading platform is of sufficient length a number of stacks of lumber may be successively disposed throughout the length thereof, and these stacks may be consecutively transferred onto a delivery truck 20. It will be understood that the floor of the delivery truck and the top of the rollers 18 are in substantially the same horizontal plane so that the stacks of lumber may be rapidly transferred from the loading platform onto the delivery trucks.

At the present time it very often occurs that the assembled loads of lumber are stacked in the alleys between the lumber piles, thus making it impossibe to pass through these alleys until the lumber has been removed. With the present invention, this is obviated, as a number of assembled loads of lumber may be side-tracked onto the loading platform without interfering with the use of the track, or any of the alleyways therebetween.

It will thus be seen that by the structure here shown it is possible to rapidly and conveniently assemble loads of lumber and to transfer them from the yard trucks onto the delivery trucks without difficulty and without interfering with the other work in the yard.

While I have shown the preferred form of my invention, it is to be understood that various changes may be made by those skilled in the art without departing from the spirit of my invention.

Having thus described my invention, what I claim and desire to secure by Letters Patent is:

1. A lumber transferring device comprising a trackway having an elevated section at a point along the length thereof, a loading platform disposed adjacent said elevated section and being fitted with a plurality of rollers disposed in the same horizontal plane and with their axes lying transversely of the longitudinal axis of the track, whereby lumber carried by trucks moving along the trackway will be deposited on said rollers and the trucks passing over the inclined portion of the trackway.

2. A lumber transferring device comprising a horizontal loading platform consisting of parallel side rails between which a plurality of parallel spaced rollers are rotatably disposed, a trackway approaching and passing beneath the loading platform, said trackway being formed with an elevated portion in the approach to the loading platform, and an incline in the portion passing beneath the platform whereby trucks passing up the incline may deposit the forward end of a stack of lumber on the loading platform and will gradually shift the lumber onto the loading platform as the trucks pass down the incline and beneath the platform.

JOHN MAHER.